Patented Feb. 17, 1948

2,436,005

UNITED STATES PATENT OFFICE 2,436,005

ELECTRICAL INSULATOR AND METHOD OF PRODUCING THE SAME

Bernard Hopps and Colin James Smithells, Rugby, England, assignors to Lodge Plugs Limited, Rugby, England, a British company No Drawing. Application August 24, 1942, Serial No. 455,940. In Great Britain November 13, 1941

6 Claims. (Cl. 106—46)

This invention relates to electrical insulators prepared by sintering mixtures in which aluminum oxide is the main constituent and to methods of making the same. Such insulators will be referred to as sintered alumina insulators. They are particularly suitable for use as insulators in sparking plugs which are employed under conditions of high mechanical stress, at high temperatures and under liability to thermal shock. Bodies made in accordance with the invention are also suitable for use as furnace tubes, thermocouple sheaths and the like, or where high mechanical strength at ordinary temperatures is desirable, for example for ceramic inserts in Bakelite mouldings.

In the manufacture of sintered alumina insulators of the kind described it has been customary to employ additions of up to 15% of silica together with up to 5% of other oxides such as alkaline earth oxides, the sintering being carried out at a temperature of 1600° C. or higher. Difficulty is encountered in obtaining uniformly high density and mechanical strength in the sintered bodies. The object of the invention is to provide sintered alumina insulators of uniformly high density and greater mechanical strength.

When sintered alumina insulators are made according to the known methods, that part of the alumina which is not combined with the silica or other oxides is present as alpha-alumina, a body having the crystalline form known as corundum. The crystalline structure of alpha-alumina is trigonal, uniaxial negative, $\alpha = 1.760$, $\omega = 1.768$, density 3.8 to 4.0.

Another form of alumina, namely beta-alumina, is also known, which has a different crystalline structure and a lower density. Beta-alumina is hexagonal, uniaxial negative, $\alpha = 1.63$ to $1.65$, $\omega 1.65$ to $1.680$ and density $3.31$. This form of alumina is sometimes found in alumina charges which have been molten and slowly cooled, or after heating mixtures of alumina containing small amounts of sodium salts. The presence of sodium oxide, certainly facilitates the formation of beta-alumina, and it has been suggested that beta-alumina is a compound or solid solution of alumina and sodium oxide containing 2.56% sodium oxide and having the formula $NaAl_{23}O_{35}$. If alumina containing beta-alumina is heated in air at 1600° C. or higher the beta-alumina is converted into the alpha form, whilst in a reducing atmosphere this takes place at a somewhat lower temperature. The change is believed to be due to the evaporation of sodium. Consequently in the manufacture of sintered alumina insulators where it is now customary to employ sintering temperatures not less than 1600° C. any beta-alumina which may be formed at lower temperatures is decomposed and the alpha form of alumina only is present.

We have found that the presence of small amounts of beta-alumina in a sintered alumina insulator results in a greater mechanical strength and higher density than is obtained at a higher sintering temperature when beta-alumina can no longer exist.

The following table gives the results of tests which we have made as to the density and relative impact strength of alumina insulators prepared by sintering at various temperatures a mixture containing 95% $Al_2O_3$, 2.5% $SiO_2$, and 0.5% $Na_2O$, the balance being oxides of calcium, magnesium, iron, chromium and minor impurities.

| Sintering Temperature | Density | Relative Impact Strength |
|---|---|---|
| 1400° C | 3.40 | 7 |
| 1450° C | 3.60 | 19 |
| 1500° C | 3.70 | 24 |
| 1550° C | 3.68 | 23 |
| 1600° C | 3.54 | 15 |
| 1650° C | 3.41 | 7 |

We have also found that the resistance to thermal shock of sintered alumina insulators decreases progressively as the sintering temperature is increased above 1400° C., and this provides an added reason for effecting the sintering at a lower temperature than has been usually employed hitherto.

According to the present invention a sintered alumina insulator of the kind described is produced by sintering below the temperature at which most of the beta-alumina is decomposed a mixture containing not less than 90% aluminium oxide, sufficient sodium oxide sufficient only to produce from 1–10% of beta-alumina, from ½ to 9% of silica, with up to 5% of material selected from the group consisting of oxides of calcium (CaO) and magnesium (MgO). In place of these oxides of course other compounds can be used which will yield the oxides on heating, such as carbonates for example, and where the term "oxides" is used herein it is intended to include such compounds. The sintering temperature will generally be in the neighbourhood of 1500° C.

Whereas it has been customary to take particular precautions to eliminate alkalis from the raw materials used in producing sintered alumina insulators in order to avoid the formation of glassy compounds our invention makes it possible to use commercial alumina containing appreciable amounts of sodium oxide, since any alkali remaining is present as beta-alumina and not as glass.

One method of putting the invention into effect, as applied particularly to sparking plug insulators, will now be described by way of example. A mixture of 95 parts of commercial alumina (containing not less than 99% alumina and from 0.4 to 0.5% sodium oxide), 3 parts of calcium carbonate or equivalent oxide and 4 parts of a highly plastic natural aluminium silicate is ground with water until the majority of the particles have a diameter of less than 1 micron. The mass is then filtered, pressed, dried and formed to the desired shape by turning or grinding in the known manner, and sintered for about 5 hours at 1510° C. The resulting sintered alumina insulators have a structure consisting of corundum, mullite and beta-alumina crystals, a density of 3.6 to 3.7 and great mechanical strength.

We claim:

1. A method of producing sintered electrical insulators consisting essentially of alumina, wherein a mixture containing at least 90% of aluminium oxide with a small percentage of sodium oxide sufficient only to produce from 1 to 10% of beta-alumina in the final product, ½ to 9% of silica and up to 5% of a material selected from the group consisting of the oxides of calcium (CaO) and magnesium (MgO), is finely ground and formed to any desired shape, and then sintered for a sufficient period at a temperature well below 1600° C. to form a dense and strong product containing an appreciable percentage of beta-alumina.

2. A method of producing sintered electrical insulators consisting essentially of alumina, wherein a mixture containing at least 90% of aluminium oxide with a small percentage of sodium oxide sufficient only to produce from 1 to 10% of beta-alumina in the final product, from ½ to 9% of silica and up to 5% of a material selected from the group consisting of oxides of calcium (CaO) and magnesium (MgO), is finely ground and formed to any desired shape, and then sintered for some hours at a temperature in the neighbourhood of 1500° C. to form a dense and strong product.

3. A method of producing sintered electrical insulators consisting essentially of alumina, wherein a mixture containing at least 90% of aluminium oxide with a small percentage of sodium oxide sufficient only to produce from 1 to 10% of beta-alumina in the final product, from ½ to 9% of silica and up to 5% of a material selected from the group consisting of oxides of calcium (CaO) and magnesium (MgO), is finely ground and formed to any desired shape, and then sintered for some hours at a temperature not exceeding 1550° C. to form a dense and strong product.

4. A method of producing sintered electrical insulators consisting essentially of alumina, wherein a mixture containing at least 90% of aluminium oxide with a small percentage of sodium oxide sufficient only to produce from 1 to 10% of beta-alumina in the final product, from ½ to 9% of silica and up to 5% of a material selected from the group consisting of oxides of calcium (CaO) and magnesium (MgO), is finely ground and formed to any desired shape, and then sintered for some hours at a temperature and under conditions such that the final product contains corundum and an appreciable percentage of beta-alumina.

5. A method of producing sintered electrical insulators according to claim 4 wherein the aluminium oxide used in the mixture consists of commercial alumina which in itself contains a fractional percentage of sodium oxide, while the silica used in the mixture consists of natural aluminum silicate, these ingredients being ground and mixed with calcium carbonate and the mixture sintered to form a product containing corundum, beta-alumina and mullite.

6. An article of manufacture comprising an electrical insulator of sintered alumina consisting essentially of corundum, a small proportion of mullite, and crystals of beta-alumina, and containing approximately 94% of alumina, not more than 3% of silica, not more than 3% of a material selected from the group consisting of the oxides of calcium (CaO) and magnesium (MgO), and a small percentage of sodium oxide.

BERNARD HOPPS.
COLIN JAMES SMITHELLS.

REFERENCES CITED

The following references are of record in the file of this patent:

UNITED STATES PATENTS

| Number | Name | Date |
|---|---|---|
| 1,942,431 | Jung | Jan. 9, 1934 |
| 1,999,382 | Weygant | Apr. 30, 1935 |
| 2,019,209 | Benner et al. | Oct. 29, 1935 |
| 2,030,200 | Gallup | Feb. 11, 1936 |
| 2,043,029 | Blan et al. | June 2, 1936 |
| 2,154,069 | Fessler et al. | Apr. 11, 1936 |
| 2,272,618 | Fessler | Feb. 10, 1942 |
| 2,311,228 | Heany | Feb. 16, 1943 |

FOREIGN PATENTS

| Number | Country | Date |
|---|---|---|
| 294,179 | Great Britain | Oct. 18, 1929 |